Patented Aug. 3, 1926.

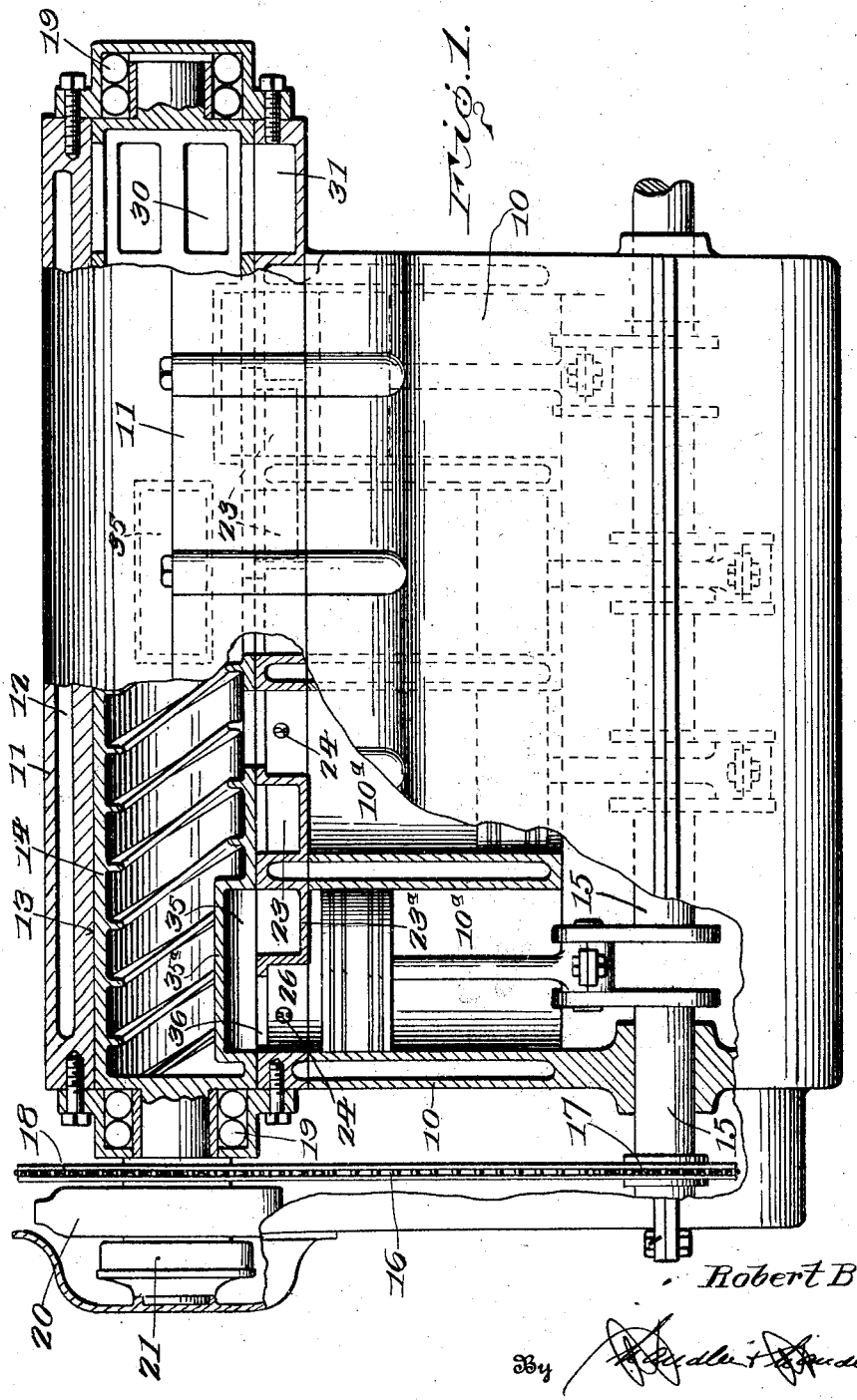

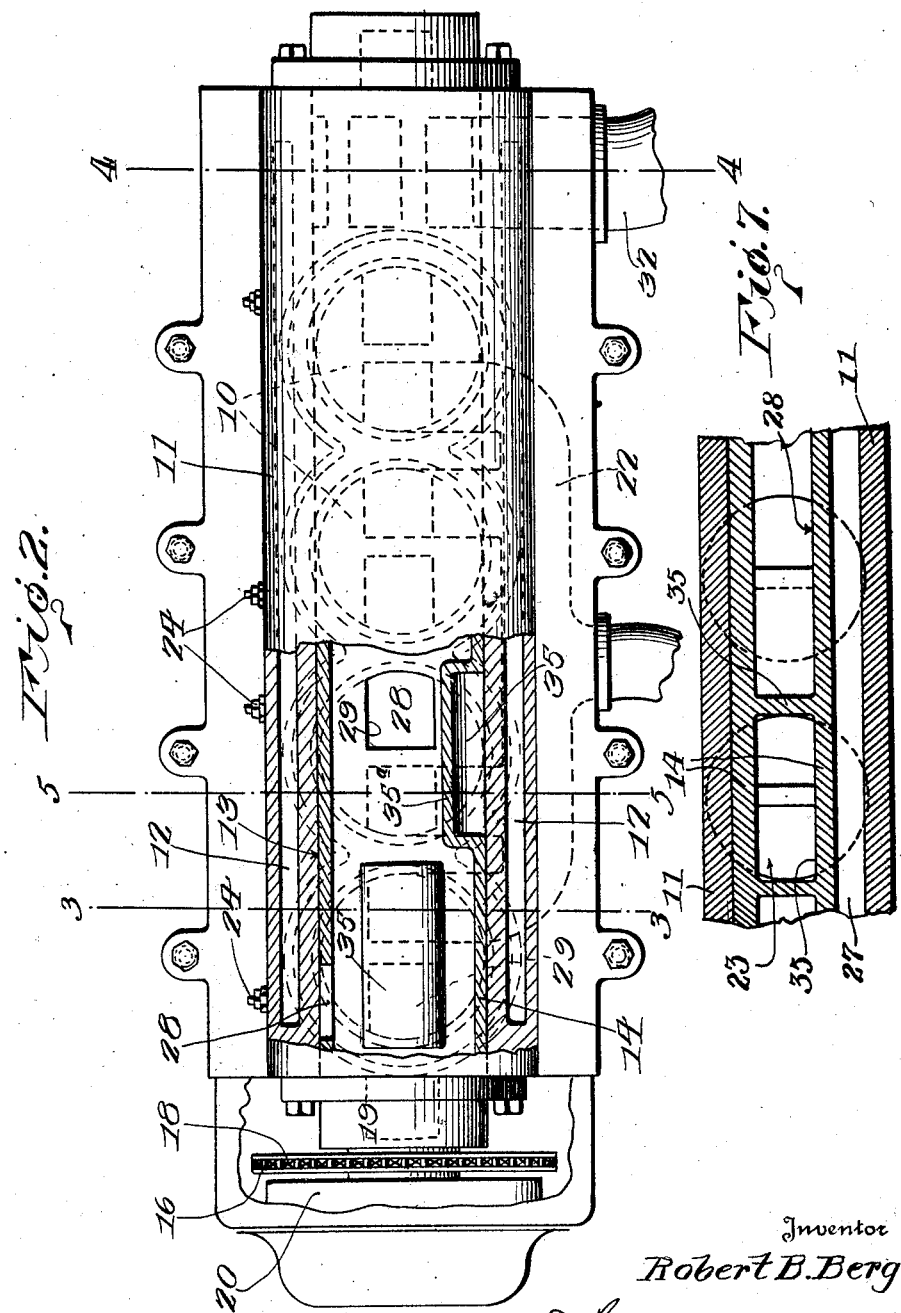

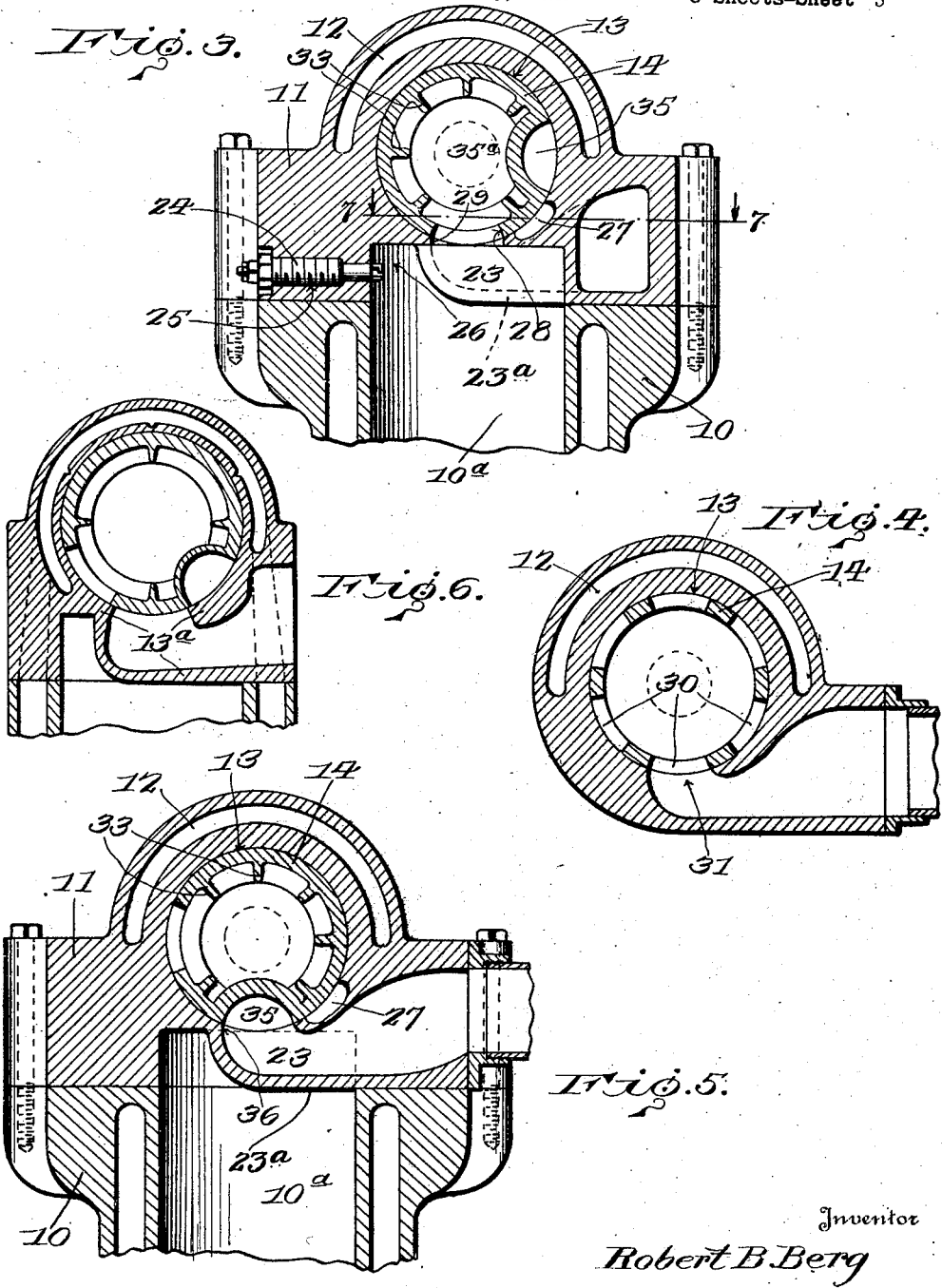

1,594,654

UNITED STATES PATENT OFFICE.

ROBERT B. BERG, OF NEW SMYRNA, FLORIDA.

INTERNAL-COMBUSTION ENGINE.

Application filed December 5, 1921. Serial No. 520,059.

The object of the invention is to provide what may, comparatively speaking, be regarded as a valveless engine of the automobile type, designed for use especially in connection with vehicles and having a feed or inlet and exhaust controlling equipment which avoids the use of and hence the inconveniences incident to independent valves for the inlet and exhaust, together with the usual cam shaft, tappets, push rods, rocker arms, and similar and related features which are embodied in the present typical forms of valve motions for engines designed for this service; and furthermore, to provide a gas or fuel intake or feed of the "hot spot" type, wherein the fuel is subjected in its path toward the cylinders to the temperature of the exhaust or products of combustion as they are discharged from the cylinders, and is also subjected to the direct heat of the explosions as a preparation for admission to the cylinders, to the end that the fuel is in the most favorable condition for ignition when it reaches the explosion chamber; and with these primary objects in view, the invention consists in a construction, combination and relation of parts, of which a typical embodiment is illustrated in the accompanying drawings, wherein:—

Figure 1 is a side view, partly broken away, and shown in longitudinal section, of an engine embodying the invention.

Figure 2 is a plan view, partly broken away to show portions of the port controlling equipment in horizontal section.

Figures 3, 4 and 5 are transverse sections, respectively, on the planes indicated by the line 3—3, 4—4, and 5—5 of Figure 2.

Figure 6 is a detailed sectional view through the valve showing same in closed position.

Fig. 7 is a section taken on line 7—7 of Fig. 3.

The cylinders 10 of which obviously any desired number may be employed (four being shown in the drawing), are fitted with a head casting 11 in which, suitably water jacketed as indicated at 12, is formed a seat 13 for the rotative valve 14, adapted for rocking or continuous rotary movement, the latter, however, being preferred and the necessary motion being communicated thereto from the crank shaft 15 through a suitable gearing such as the chain 16 and sprocket wheels 17 and 18, the valve being mounted in suitable ball bearings 19 and adapted to directly operate the water or circulating pump 20 and the spark timer 21, all of which are indicated in a general way and may be of the conventional types.

The intake manifold 22, adapted to be connected in the ordinary way with a carburetor, may be formed, as shown, by coring the cylinder head, and in communication with the manifold, there is provided for each cylinder or cylinder unit of the structure a fuel feed chamber or detention pocket 23 extending into the explosion chamber $10^a$ of the cylinder with a relatively thin wall $23^a$ separating the same from the explosion chamber and exposed directly to the heat of the explosion in the cylinder. The spark plug 24 is arranged in a seat 25 extended laterally into the head of the cylinder in a common transverse plane with the feed chamber or detention pocket 23 and spaced from the inner end of the latter by an intermediate compression space 26 in which the ignition of the charge takes place so that the feed chamber or detention pocket is largely surrounded by the ignited gases during the explosion of the charge. In order to accentuate this effect of exposing the charge of fuel to the heat of the explosion of the preceding charge, or the charge which has preceded it into the cylinder, a channel 27 is cored in the wall of the valve casing or head between the upper side of the feed chamber or detention pocket 23 and the valve seat, and in communication with the series of chambers 23.

The valve is of tubular form to adapt it to perform the function of an exhaust conveyor and is provided with a series of lateral ports 28 for respective registration with exhaust ports 29 communicating with the explosion chambers of the several cylinders, the exhaust outlet from said conveyor consisting of a plurality of lateral openings 30 formed in the wall of the valve near one end and beyond the series of cylinders for communication with an exhaust port 31, from which leads the ordinary exhaust pipe or manifold 32 or any preferred means of disposing of the exhaust gases. The outlet ports 30 are arranged in closely spaced relation throughout the perimeter of the valve so as to maintain a continuous communication with the exhaust or outlet port 31. Also in order to induce or provide for a forced passage of the products of combustion through the exhaust conveyor represented by the valve, spirally disposed webs or wings 33 may be arranged therein, as shown in the drawing.

The valve is provided, in relation to each cylinder with a feed passage 35 of substantially D-valve form which extends into the exhaust passage and thence into the path of the exhaust or products of combustion in the movement thereof from the cylinders toward the outlet, and serving to a certain extent to baffle or detain the products of combustion in the conveyor, said inlet or feed passages being separated from the exhaust passage by relatively thin walls 35$^a$ so that the heat of the exhaust or products of combustion may be communicated to the fuel gas as it passes to the cylinders. These feed or inlet passages 35 are arranged to periodically establish communication between the feed chambers or detention pockets 23 and the cylinder ports 29, the outlets from the said feed chambers or detention pockets being indicated at 36 and being on the same longitudinal lines as the cylinder ports 29 so that the exhaust ports and said passages of the valve alternately register with the cylinder ports 29 and alternately establish communication between the explosion chamber of the cylinder and the exhaust conveyor represented by the interior of the valve, and said feed chambers or detention pockets and the explosive chamber, to alternately permit the exhaust of an exploded charge and the inlet of the fresh charge. The fresh charge of gas, as will be obvious, passes through the feed chamber 23 and feed passage 35 in continuous exposure to the heat of the exhaust so that the temperature thereof is raised to a relatively high degree before entering the explosion chamber of the cylinder and, in addition thereto a portion at least of the new cylinder charge which has occupied the feed chamber or detention pocket 23, has been exposed to the heat of the direct explosion of the previous charge or the charge which has preceded it into the cylinder, together with the accumulated heat of the walls of the explosion chamber.

It will be obvious that annoyance due to the lost motion incident, under ordinary conditions, to the use of tappets, push rods, rocker arms and the like in the operation of poppet valves is avoided by the employment of a valve mechanism constructed in accordance with the invention herein disclosed, and the frequent adjustments due to the wear of such conventional valve mechanism are rendered unnecessary. The friction incident to the movement of the common rotary valve constituting the exhaust conveyor of the present structure is minimized by antifriction bearing which obviously may be either of the ball, roller, or other take-up type with a sufficient reduction in exterior diameter of the valve with reference to its seat to avoid actual contact of the surfaces, so that the deposit of carbon on or between said surfaces merely tends to insure a gas tight joint, while permitting expansion of the valve structure relative to the seat in which it is mounted.

As will be noted, a common cylinder port is employed in the disclosed structure, to serve the functions of both a cylinder feed or intake port and a cylinder exhaust port.

To minimize or eliminate the necessity of any difference between the exterior diameter of the valve and the diameter of its seat in the casing, and thereby limit or remove any tendency of gases under stress or compression to escape between the surfaces thereof and thus reduce the effectiveness of compression in the cylinders when the parts are relatively cool, it has been found expedient to proportion said parts to effect an approximate fit and compensate for expansion and contraction under variations of temperature by making the walls of the valve thicker than those of the seat as shown. The walls of the valve obviously will be subjected constantly and directly to the effect of the hot gases passing therethrough, while the walls of the seat will be subjected to the heat only indirectly except at the exposed portions 13$^a$ which, as shown, may be thickened proportionately to the walls of the valve. Moreover, the expansive tendency of the seat may be increased slightly by providing the exterior surface thereof with a series of cored V-shaped grooves extending longitudinally thereof.

The foregoing specifically described construction of the valve and seat is particularly illustrated in Figure 6.

What is claimed is:—

1. An internal combustion engine including a plurality of cylinders each having an inlet and an exhaust port, a rotatable exhaust conduit having ports communicating with the interior thereof for periodic registry with the exhaust ports of the cylinders, and longitudinal indentations forming intake passages in the peripheral wall of the exhaust conduit at angularly and longitudinally spaced distances around said conduit for the separate inlet ports of the cylinders, and longitudinal passages for live gas in the cylinder heads of lengths commensurate with and registering with said intake passages.

2. An internal combustion engine including a plurality of cylinders having inlet and exhaust ports, and a rotatable exhaust conduit having ports communicating with the interior thereof for periodic registry with the exhaust ports of the cylinders, the peripheral wall of the said conduit having a series of longitudinal indentations forming passages arranged to periodically register with and establish communication between the inlet ports and the manifold of the engine, the walls of said indentations being within the conduit and in direct contact with the hot exhaust gases therein, the cylinder heads each having a longitudinal channel arranged to register with said passages formed by the indentations and being in direct communication with the intake manifold of the engine.

3. An internal combustion engine including a plurality of cylinders each having an inlet port and an exhaust port, and a rotatable exhaust conduit having angularly and longitudinally spaced ports communicating with the interior thereof and adapted for periodic registry with the exhaust ports of the cylinders, the exterior wall of the conduit having elongated indentations disposed in angular and longitudinal spaced relation to form intake passages for the separate inlet ports of the cylinders, an inlet manifold, and a seat for the conduit having a longitudinal channel in the wall thereof, the open side being directed toward the conduit and being closed by the wall of the conduit, in constant communication with the manifold and periodic communication with the said intake passages, the interior of the exhaust conduit having spirally arranged ribs for urging the exhaust gases toward the outlet end of said conduit.

In testimony whereof, I affix my signature.

ROBERT B. BERG.